United States Patent [19]

Pinomaa

[11] Patent Number: 5,021,476

[45] Date of Patent: Jun. 4, 1991

[54] DYEABLE PAVEMENT MATERIAL

[75] Inventor: Olli Pinomaa, Helsinki, Finland

[73] Assignee: O Pinomaa KY, Helsinki, Finland

[21] Appl. No.: 232,154

[22] Filed: Aug. 15, 1988

[30] Foreign Application Priority Data

| | | |
|---|---|---|
| Aug. 27, 1987 [FI] | Finland | 873713 |
| Nov. 10, 1987 [FI] | Finland | 874963 |
| Jan. 22, 1988 [FI] | Finland | 880305 |

[51] Int. Cl.$^5$ ............................................. C08J 3/22
[52] U.S. Cl. ..................... 524/77; 524/270; 524/585; 524/587
[58] Field of Search ............... 524/270, 585, 587, 77

[56] References Cited

U.S. PATENT DOCUMENTS

| | | | |
|---|---|---|---|
| 1,341,490 | 5/1920 | Wester | 524/77 |
| 4,272,582 | 6/1981 | Kumins et al. | 524/77 |
| 4,324,711 | 4/1982 | Tanaka et al. | 524/270 |
| 4,362,568 | 12/1982 | Ostermeyer | 106/232 |
| 4,437,896 | 3/1984 | Partanen | 106/273 R |
| 4,613,632 | 9/1986 | Aliani et al. | 524/77 |
| 4,822,425 | 4/1989 | Burch | 106/273.1 |

FOREIGN PATENT DOCUMENTS 1379392  1/1975  United Kingdom .

OTHER PUBLICATIONS

Chemical Abstract 95 11638 b (JP-80-161853) published 12-16-80.
Chemical Abstract 88 11046 n, Leisher & Ivanova, Lesokhim, Podsochka, 1977, No. 6, pp. 4–5.
USSR Inventor's Certificate 188535, Inventors: E. B. Kanevskaya and S. I. Gelfand; 12-24-1966.

*Primary Examiner*—Lewis T. Jacobs
*Assistant Examiner*—Karen A. Hellender
*Attorney, Agent, or Firm*—Dressler, Goldsmith, Shore, Sutker & Milnamow, Ltd.

[57] ABSTRACT

The invention relates to an elastic street pavement mass comprising aggregate bound by a binder and, when needed, coloring agents and other additives, and which is particularly suitable for preparing pavements having the shade of the aggregate or being toned. The efforts made so far to replace bitumen, which is hard to dye, by a colorless binder, have resulted in the use of expensive and brittle binders. However, an economical, strong and dyeable pavement mass has now been discovered, the binder of which consists of tall oil resin, wood resin, turpentine resin, their derivatives or a mixture formed by these agents, and of a process oil softening the above resins, comprising additionally rubber and plastic as auxiliary agents. The products have a better stability and at least as high an abrasion resistance to studded tires as a conventional bituminous pavement mass.

29 Claims, No Drawings

DYEABLE PAVEMENT MATERIAL

The invention relates to an elastic pavement mass, which comprises an aggregate bound by a binding agent and, when needed, colouring agents and other additives. The pavement mass according to the invention is particularly appropriate for the preparation of non-black pavements.

Pavement masses usually consist of aggregate bound by bitumen, and they are cast in layers of 1 to 5 cm on top of the supporting layer of the road. When choosing the particle size of the aggregate, a so-called proportioning is applied, in which the diameter of the coarsest stones is c. 8 to 25 mm. The drawback of these pavements is their black colour, which is due to the bitumen used as a binding agent. However, the bitumen may be replaced by a colourless binding agent, which can be further pigmented to the desired tone. Colourless resin has been used as a binder component of pavement masses in the United States and also in Finland in the 70's. Petrochemical hydrocarbonaceous resins were then used, which were obtained from the by-product of the ethylene unit of petroleum refining by polymerizing unsaturated $C_5-C_{10}$ hydrocarbons. The trade marks of such resins are Escorez 1100 or Piccopale. Petrochemical hydrocarbonaceous resins have, however, the drawback of being expensive and of failing to provide sufficiently stabile pavements.

Tall oil rosin and its derivatives have so far been used only as pigmented pavement paints, which have been laid onto the pavement as a curable coating having a thickness of 1 to 5 mm. Such a pavement paint is brittle as such and does not pass the Marshall strength test intended for testing bituminous concrete.

However, it has now been observed that plasticized tall oil rosin, wood or turpentine resin or their derivative is most appropriate as a binder of pavement masses. Even excellent Marshall strength values are achieved by a binder based on plasticized resin or its derivative.

The purpose of the above invention is consequently to provide a dyeable, elastic and stable pavement mass by replacing conventional binders of the pavement mass by a new binder, which makes the mass both dyeable and tougher. Thus, the invention is essentially characterized by the facts mentioned in the characterizing part of the claims. Simultaneously, a new use has been discovered for a number of important byproducts of wood processing industry.

The new pavement mass consists of the following three main components:
  aggregate, colouring and filling agents
  tall, wood and turpentine resin and their derivatives
  a plasticizing lubricating oil and its auxiliary agents
  auxiliary agents and additives.

When choosing the aggregate, all the aggregate proportionings of asphalt industry are applicable. Good results have been achieved even by using natural moraine. In the proportioning, the coarsest stones may have a diameter of e.g. 25 mm, 20 mm, 16 mm, 12 mm or 8 mm. In general, a coarser aggregate provides a more abrasion-resistant pavement mass. An ordinary filler, like a lime filler or kaolin, is appropriate as a filler, either intermixed with the aggregate or as such.

Any pigment of the desired shade that is stable in the preparation and operation conditions may be used as a pigment. Appropriate pigments are inorganic toners, e.g. white titanium dioxide, green chromium dioxide or red iron oxide.

As a binder main component, tall oil rosin, wood resin, turpentine resin or any of their derivatives, which are produced by cellulose industry, are practicable. The derivative can for instance be a dimer, oligomer or polymer, or an ester with some univalent or polyvalent alcohol, such as trimethylpropanol, glycerol or pentaerythritol. The derivative can also be e.g. a metal salt of resins, whereby the metal is preferably zinc, calcium or magnesium. Before the di-, oligo- or polymerizing, esterifizing or neutralizing into salt of the resin, it can be treated with some unsaturated dicarboxylic acid or its anhydrid, such as fumaric acid, maleic acid or maleic acid anhydride. The binding agent may also be any appropriate mixture of the above resins and derivatives or a mixture with some known resin.

The derivatives are of course more expensive than the resins, and are thus better suitable for special purposes. Consequently, tall resin ester, which is more expensive than tall oil rosin, is most appropriate for preparing very stabile pavement masses.

Crystalline tall oil rosin produced by cellulose industry has proved an economical and practicable universal resin, the softening temperature of which is c. 65° C. or 73° C.

In order to make a road pavement mass tough and elastic, a softening lubricating oil is required in addition to the rosin component. The lubricating oil may be any oil, like mineral oil, vegetable oil, tall oil or the derivatives of these. The viscosity of the lubricating oil depends on the preparation and operating conditions and may vary in the range of ISO 15 to ISO 680, preferably in the range of ISO 32 to ISO 220. A mineral oil having a viscosity of ISO 220 is for instance suitable for ordinary use. By using e.g. vegetable oils having a low pour point, more frost-resistant qualities are achieved and lower temperatures are applicable on the operating sites.

It is advantageous to add rubber to the binding agent in order to improve the cold resistance of the composition. Any elastomer may be used for this purpose, however, the elastomers used in so-called rubber asphalts have proved the most advantageous, e.g. the Cariflex TR products of Shell, which are styrenebutadiene elastomers.

By adding compatible thermoplastic to the binder, the thermosensitivity of the pavement mass may be reduced so as to avoid brittleness by cold temperatures and softening by heat. Appropriate thermoplastics are polyolefines that melt at the preparation temperature, such as polyethylene and polypropene, polyamides and polyesters.

An optimal pavement mass is obtained by adding both rubber and thermoplastic to the binding agent, whereby the product has a good cold resistance combined with a high softening temperature.

When preparing the tough and elastic pavement mass according to the invention, ordinary asphalt and asphaltizing equipment can be used. The used binder amount can vary in the range of 3 to 15% by weight of the total pavement mass, depending on the purpose of use. Preferably 5 to 7% by weight of binding agent is used at least when this agent is tall resin. The binding agent can contain about 10 to 40% by weight of a softening process oil calculated on the total mass of the binding agent, however, about 15-20% by weight is preferably used.

About 1 to 20% by weight of rubber calculated on the mass of the binding agent can be used, whereby tall rosin together with a process oil and possible additives are considered binding agents. Preferably about 2 to 10% by weight of rubber calculated on the weight of the binder is used. About 1 to 20% by weight of plastic is used, preferably 3 to 15% by weight of the mass of the binder.

The invention is explained by means of the following examples, in which the indicated amounts of material and conditions may vary. Examples 1 to 3 deal with binders consisting of ordinary rosin and ordinary oils and example 4 illustrates a binder generating a particularly strong mass of resin ester and diesel oil. The pavement masses have been tested by means of ASTM standard D 1559 i.e. the so-called Marshall test, in which the power is measured, by which a cylindrical body of a length of 50 to 70 mm and a diameter of 100 mm is crushed. This test is the most important strength test of bituminous asphalt concrete.

EXAMPLE 1

The starting materials are:

| A. Aggregate, colouring agents and fillers: | | |
|---|---|---|
| Material | Coarseness | Amount |
| Crushed limestone | 0–7 mm | 1 800 g |
| Quartz sand | 3–5 mm | 1 000 g |
| Sand | 0–2 mm | 660 g |
| Lime filler | (mixture) | 250 g |
| Kaolin | | 350 g |
| Titanium dioxide | (RN-56) | 350 g | and

| B. Binder | |
|---|---|
| Material | Amount |
| Tall oil rosin | 300 g |
| lubricating oil (ISO 220) | 70 g |
| Polyethylene plastic (flocculated) | 18 g |

The components A are pretreated by heating in a heating chamber until 160°–180° C.

The components B are pretreated so that the tall resin is finely crushed and the lubricating oil and the plastic are intermixed into it, and the mixture is heated in a heating chamber until 160° C. so as to form a homogeneous liquid, or the tall resin is melted at 160° and the oil and plastic are blended by maintaining the temperature at 180° C.

The blending of components A and B is carried out in a "pear shaped" concrete mixer heated from the outside by a liquid gas flame in which the temperature is c. 150° C. The mixing time is c. 1 to 2 minutes, at the end of which the composition has turned into a thick pasty or semi-liquid state. The pavement mass can now be poured onto the support for subsequent compacting or hot-rolling.

During this example the aggregate, colouring agent and filler amounts (A) were kept constant, however, in the material combination B, the variations of table 1 were implemented and the Marshall strength values also appearing from table 1 were obtained.

TABLE 1

| | Test nr | |
|---|---|---|
| | 1 | 2 |
| A. components (g) | 4410 | 4410 |
| Tall oil rosin (g) | 300 | 300 |
| Lubricating oil (ISO 220) (g) | 70 | 150 |
| Polyethylene (g) | 18 | 60 |
| Binder/mass × 100 | 8.1% by weight | 10.4% by weight |
| Oil component/binder × 100 | 22.7% by weight | 41.1% by weight |
| Marshall value KN | 7.0 | 4.6 |

EXAMPLE 2

The following blending was accomplished and the working method was the same as in example 1.

| A. Aggregate, colouring agents and fillers | | |
|---|---|---|
| Material | Coarseness (AB 12 III) | Amount |
| Lime filler | | 125 g |
| " | 0–0.074 mm | 125 g |
| " | 0.074–0.125 mm | 175 g |
| " | 0.125–0.250 mm | 250 g |
| " | 0.250–0.5 mm | 250 g |
| " | 0.5–2 mm | 500 g |
| " | 2–6 mm | 475 g |
| " | 6–12 mm | 600 g |
| Titanium dioxide | | 235 g |
| A Total | | 2 735 g |

| B Binder | |
|---|---|
| Material | Amount |
| Tall oil rosin | 160 g |
| Vegetable oil (ISO 32) | 30 g |
| B Total | 190 g |
| Binders/mass × 100 | 6.5% by weight |
| Oil component/binders × 100 | 15.8% by weight |
| Marshall value (average) KN | 6.0 |

EXAMPLE 3

In this example the component A is otherwise the same as in example 3, however the titanium dioxide is replaced by the following pigments:

| Material | Amount |
|---|---|
| Titanium dioxide | 100 g |
| Chrome dioxide | 135 g (green) |
| A Total | 2 735 g |

| B Binder | |
|---|---|
| Material | Amount |
| Tall oil rosin | 162 g |
| Process oil (mineral) ISO 220 | 38 g |
| B Total | 200 g |
| Binders/mass × 100 | 6.8% by weight |
| Oil component/binders × 100 | 19% by weight |
| Marshall value (average) KN | 8.4 |

EXAMPLE 4

The blending was carried out as follows and the working method was the same as in example 1.

| A. Aggregate, colouring and filling agents | |
| --- | --- |
| Material | Amount |
| Moraine | 920 g |
| Titanium dioxide | 80 g |
| Kaolin | 80 g |
| A Total | 1080 g |

| B. Binder | |
| --- | --- |
| Material | Amount |
| Tall resin ester* | 90 g |
| Diesel oil | 18 g |
| Polypropene | 5 g |
| B Total | 113 g |
| Binders/raw material × 100 | 9.47% |
| Marshall value KN | 34 |

* = Tall resin ester is tall oil rosin modified by fumaric acid, in which the esterifizing alcohol is pentaerythritol and glycerol.

EXAMPLE 5

The cold resistance was measured by determining the breaking point Fraass of a test specimen (IP 80/53) at a reduced temperature, and the heat resistance was measured by determining the softening point by means of the ring and ball method (ASTM D 2398-76). The test results of various compositions of the binding agent are compiled in the following table.

| | Binder composition | | | | | Breaking point | |
| --- | --- | --- | --- | --- | --- | --- | --- |
| Test | Rosin g | Oil quality | Oil amount g | Rubber g | Plastic g | C.° (Fraass) | Softening point C.° |
| 1 | 100 | ko | 19 | | | −3 | i |
| 2 | 100 | k220 | 25 | | | −2 | i |
| 3 | 100 | k32 | 25 | | | −5 | i |
| 4 | 100 | ko | 25 | 6 | | −34 | i |
| 5 | 100 | k32 | 25 | 7 | | −17 | i |
| 6 | 100 | k32 | 47 | 11 | | −36 | i |
| 7 | 100 | k32 | 25 | 7 | 10 | −14 | 92 |
| 8 | 100 | ko | 25 | 6 | 10 | −21 | 44 |

Explanations: the rosin used was a soft, unconvertible tall oil rosin, the rubber was a SBR rubber (Cariflex Tr-1101) and the plastic was polyethylene.

kö = vegetable oil
k220 = lubricating oil, having a viscosity of 220 cSt/40°
k32 = lubricating oil having a viscosity of 32 cSt/40°
i = too soft to be measured by the ring and roll method.

These compositions aim at values that are in the range of −12° to −16° C. at the breaking point, and at >40° C. at the softening point.

The results show that rubber improves the cold resistance, however both rubber and plastic are needed for the product to possess both a good cold resistance and a good heat resistance (high softening point). One notes that test 8 is close to the ideal in our climate, whereas test 7 represents the ideal composition in a temperate climate.

By using correctly softened tall resin or its derivatives a significantly better adhesiveness to the aggregate is achieved than by petrochemical products, moreover they are noticeably less expensive and are available on the domestic market. It should also be noted that far more stabile pavements are achieved by using tall oil rosin than by bitumen. For instance, the Marshall value for a tall resinous pavement is 6-9 KN, whereas the analogue value for a bituminous pavement is 4-6 KN. The abrasion resistance to studded tyres is at least as high as on an asphalt concrete pavement. The use of vegetable oils improves the temperature sensitivity and frost resistance of the binder, as does a correct choice of viscosity in general.

The toned and pale pavement compositions according to the present invention can be used on special roads, in crossings to mark a dangerous zone, in the shoulder part of roadways, in court-yards and porches, on pedestrian levels and bridges.

What is claimed is:

1. An elastic street pavement mass comprising aggregate bound by a binding agent, characterized in that said binding agent comprises:
   a natural resin selected from a group consisting of tall oil rosin, wood resin, and turpentine resin;
   a solid polymer selected from a group consisting of polypropene, polyethylene, polyamide and polyester; and
   a process oil selected from a group including mineral oil, vegetable oil and tall oil.

2. A pavement mass according to claim 1, characterized in that the amount of binding agent is c. 3 to 15% of the weight of the total pavement mass.

3. A pavement mass according to claim 1, characterized in that the amount of binding agent is c. 5 to 7% of the weight of the total pavement mass.

4. A pavement mass according to claim 2, characterized in that the amount of process oil is 10 to 40% of the weight of the binding agent.

5. A pavement mass according to claim 2, characterized in that the amount of process oil is 15 to 20% of the weight of the binding agent.

6. A pavement mass according to claim 2, characterized in that the amount of solid polymer is c. 1 to 20% of the weight of the binding agent.

7. A pavement mass according to claim 2, characterized in that the amount of solid polymer is 3 to 15% of the weight of the binding agent.

8. A pavement mass according to claim 1, characterized in that a rubber is substituted for the solid polymer.

9. A pavement mass according to claim 8, characterized in that the amount of the binding agent is c. 3 to 15% of the weight of the total pavement mass.

10. A pavement mass according to claim 8, characterized in that the amount of the binding agent is c. 5 to 7% of the weight of the total pavement mass.

11. A pavement mass according to claim 9, characterized in that the amount of process oil is 10 to 40% of the weight of the binding agent.

12. A pavement mass according to claim 9, characterized in that the amount of process oil is 15 to 20% of the weight of the binding agent.

13. A pavement mass according to claim 9, characterized in that the amount of rubber is c. 1 to 20% of the weight of the binding agent.

14. A pavement mass according to claim 9, characterized in that the amount of rubber if c. 2 to 10% of the weight of the binding agent.

15. A pavement mass according to claim 8, characterized in that the rubber is styrene butadiene rubber.

16. A pavement mass according to claim 2, characterized in that the binding agent comprises said solid polymer and a rubber.

17. A pavement mass according to claim 16, characterized in that the amount of rubber is c. 1 to 20% of the weight of the binding agent.

18. A pavement mass according to claim 16, characterized in that the amount of rubber is c. 2 to 10% of the weight of the binding agent.

19. A pavement mass according to claim 16, characterized in that the rubber is styrene butadiene rubber.

20. A pavement mass according to claim 16, characterized in that the amount of solid polymer is c. 1 to 20% of the weight of the binding agent.

21. A pavement mass according to claim 16, characterized in that the amount of solid polymer is c. 3 to 15% of the weight of the binding agent.

22. A pavement mass according to claim 16, characterized in that the amount of process oil is 10 to 40% of the weight of the binding agent.

23. A pavement mass according to claim 16, characterized in that the amount of process oil is 15 to 20% of the weight of the binding agent.

24. A pavement mass according to claim 16, characterized in that the viscosity of the process oil is in the range of ISO 15 to ISO 680.

25. A pavement mass according to claim 16, characterized in that the viscosity of the process oil is in the range of ISO 32 to ISO 220.

26. A pavement mass according to claim 1, characterized in that the viscosity of the process oil is in the range of ISO 15 to ISO 680.

27. A pavement mass according to claim 1, characterized in that the viscosity of the process oil is in the range of ISO 32 to ISO 220.

28. A pavement mass according to claim 1, comprising inorganic pigment coloring agents.

29. A pavement mass according to claim 16, comprising inorganic pigment coloring agents.

* * * * *